US008821033B2

(12) United States Patent
Rosenberg et al.

(10) Patent No.: US 8,821,033 B2
(45) Date of Patent: Sep. 2, 2014

(54) OPTICAL CONNECTOR

(75) Inventors: Paul Kessler Rosenberg, Sunnyvale, CA (US); Michael Renne Ty Tan, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/881,087

(22) PCT Filed: Oct. 29, 2010

(86) PCT No.: PCT/US2010/054801
§ 371 (c)(1),
(2), (4) Date: Apr. 23, 2013

(87) PCT Pub. No.: WO2012/057798
PCT Pub. Date: May 3, 2012

(65) Prior Publication Data
US 2013/0202253 A1 Aug. 8, 2013

(51) Int. Cl.
*G02B 6/38* (2006.01)
*G02B 6/36* (2006.01)

(52) U.S. Cl.
CPC ............... *G02B 6/38* (2013.01); *G02B 6/3897* (2013.01); *G02B 6/3652* (2013.01); *G02B 6/3839* (2013.01); *G02B 6/3885* (2013.01); *G02B 6/3853* (2013.01)
USPC .................. 385/70; 385/58; 385/60; 385/65; 385/71; 385/72

(58) Field of Classification Search
USPC .................. 385/53, 55, 58, 60, 65, 70, 71, 72
See application file for complete search history.

(56) References Cited

U.S. PATENT DOCUMENTS

| 5,214,730 A | 5/1993 | Nagasawa et al. |
| 5,633,968 A | 5/1997 | Sheem |
| 5,787,214 A * | 7/1998 | Harpin et al. .................... 385/49 |
| 6,243,518 B1 | 6/2001 | Lee et al. |
| 6,394,661 B1 | 5/2002 | Cull et al. |
| 6,616,342 B2 * | 9/2003 | Kiani ............................. 385/54 |
| 6,659,654 B2 | 12/2003 | Kao |
| 7,827,488 B2 | 11/2010 | Sitrick |
| 2002/0146214 A1 | 10/2002 | Tanaka et al. |
| 2002/0172468 A1 | 11/2002 | Naghski et al. |

FOREIGN PATENT DOCUMENTS

| JP | 1990-088350 U | 7/1990 |
| JP | 05-034544 | 2/1993 |
| JP | 1994-059159 A | 3/1994 |

(Continued)

OTHER PUBLICATIONS

International Search Report, Jul. 27, 2011, PCT Application No. PCT/US2010/054801.

*Primary Examiner* — Jennifer Doan

(57) ABSTRACT

An optical connector includes a connector plate having a connecting face operable to mate with a different connecting face on a different optical connector. A slot can be formed in a side of the connector plate and have a length (L) extending from the connecting face to an opposite face in a direction substantially perpendicular to the connecting face. A groove can be formed in a portion of the bottom wall of the slot and can extend at least partially along the length of the slot. The groove can receive an optical fiber. The optical connector can also include a retaining block shaped to fit between side walls of the slot and between the connecting face and the opposite face to retain the optical fiber within the groove.

14 Claims, 6 Drawing Sheets

(56) References Cited

FOREIGN PATENT DOCUMENTS

| | | |
|---|---|---|
| JP | 1997-269436 A | 10/1997 |
| JP | 1998-221567 A | 8/1998 |
| JP | 1999-119057 A | 4/1999 |
| JP | 2005258372 | 9/2005 |
| JP | 2006053260 | 2/2006 |
| JP | 2008-151843 A | 7/2008 |
| KR | 10-2000-0050765 | 8/2000 |

* cited by examiner

OPTICAL CONNECTOR

BACKGROUND

Interconnects are used between components and devices on printed circuit boards (PCBs) allowing components and devices to communicate with each other as part of a larger computer system. PCBs are often stacked together on edge as blades assembled into a computer chassis and electrically connected to other blades, switches, etc through a backplane to provide a system flexibility and greater density within a limited space.

Interconnects can allow devices in a computer system to communicate with each other using electrical or optical signals. Often high speed electrical and optical interconnects use bulky and expensive cabling. Interconnect assemblies can be used to couple optical fibers together so that light from a bundle of one or more fibers in one end of the connector assembly will pass through the connector assembly to fibers or a device connected to the other end of the connector assembly. Optical connector assemblies typically contain one or more ferrule components which precisely position individual optical fibers such that, when two connector assemblies are mated, the optical fibers contained therein will be precisely located with respect to one another, and capable of efficiently transferring optical energy through the mated pairs of optical fibers in each connector assembly For efficient transfer of optical energy, optical fibers in each ferrule part are typically located with a true position accuracy of less than 5 um for multi-mode fiber and 1 um or less for single mode fiber. In addition to precise positioning of the optical fibers, use of multi-fiber connector assemblies also typically involves highly precise location of features used to position two connector assemblies with respect to each other. As a result, molding or machining of locating features into the ferrules in the number and size to hold multiple optical fibers and associated external locating features can be difficult. The complexities and costs of assembly and manufacture of existing interconnect assemblies can increase the cost of integration of optical components into computing technologies.

DETAILED DESCRIPTION

Figure 1:
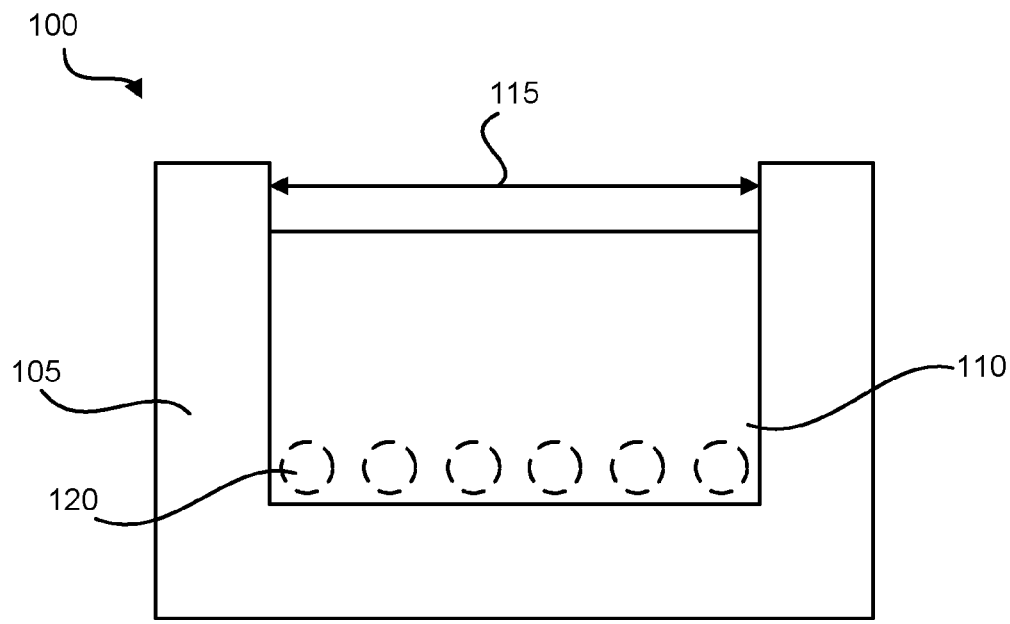
FIG. 1 is a front view of an optical connector in accordance with an example.

Alterations and further modifications of the features illustrated herein, and additional applications of the principles of the technology as illustrated herein, which would occur to one skilled in the relevant art and having possession of this disclosure, are to be considered within the scope of the technology. The same reference numerals in different drawings represent the same element.

Typical multi-fiber optical connectors implement a ferrule to provide precise positioning of the optical fibers in an interconnect. However, existing hardware for optical blind mate connection of computer or network blade printed circuit boards (PCBs) with a backplane PCB has various shortcomings. For example, the hardware in such connectors is physically relatively large and can occupy valuable space within a system. Various prior optical connector solutions were designed a number of years ago for lower bandwidth environments in which physical space and cost were not as much of an issue, particularly since lower bandwidth entails fewer used connectors. In addition, the hardware in such connectors typically consists of multiple precision parts. As a result, there is inherent inefficiency and a loss of connector precision in making and assembling multiple component parts. The hardware in the optical connectors is generally designed such that mating of connector halves can occur in the direction of blade insertion into the backplane (i.e., front to back). Use of multiple precision parts also increases a complexity and cost of optical connectors and systems.

In one example, an optical connector for optically connecting circuit boards includes a connector plate operable to mate with a different optical connector. A slot can be formed in a side of the connector plate. A groove can be formed in a bottom wall of the slot for receiving an optical fiber. The optical connector can include a lens shaped to fit within the slot to retain the optical fiber within the groove.

The connector (or interconnect) can be used in or for optical-optical, optical-electrical (OE), or electro-optical connection of one PCB with another. For example, multiple blades or backplanes may be optically interconnected using the connector. Also, blades and backplanes may be connected together. Other types of PCBs may also be connected. Additionally, devices other than circuit boards may also be optically connected using the connector. The connector may couple multiple electrical, optical, or electro-optical devices together. In other words, the coupleable devices may include electrical devices, optical devices, or devices using both electrical and optical signals for internal circuit operation or inter-chip communication. The connector may be viewed as one of two connectors or may comprise two connector halves that, when aligned, can provide an optical connection between at least two devices.

FIG. 1 illustrates a front view of a connector 100. The connector can be attached to a PCB, an integrated circuit, or other device. The connector can include a connector plate 105 and a retaining device 110 for holding optical fibers 120 within a slot 115 in the connector plate. In one example, the retaining block may comprise a lens. The lens can be removably positioned within the slot to hold optical fibers in position within the slot. In FIG. 1, ends of the optical fibers are positioned behind the lens and are configured to emit an optical signal which is transmitted through the lens into optical fibers in another optical connector positioned adjacent the connector shown. The optical fibers can be from a fiber-optic ribbon, or cable, or other device having optical fibers therein. For example, a PCB may include optical waveguides configured to couple an optical signal into a fiber-optic ribbon which delivers the optical signal to the optical connector.

Figure 2:
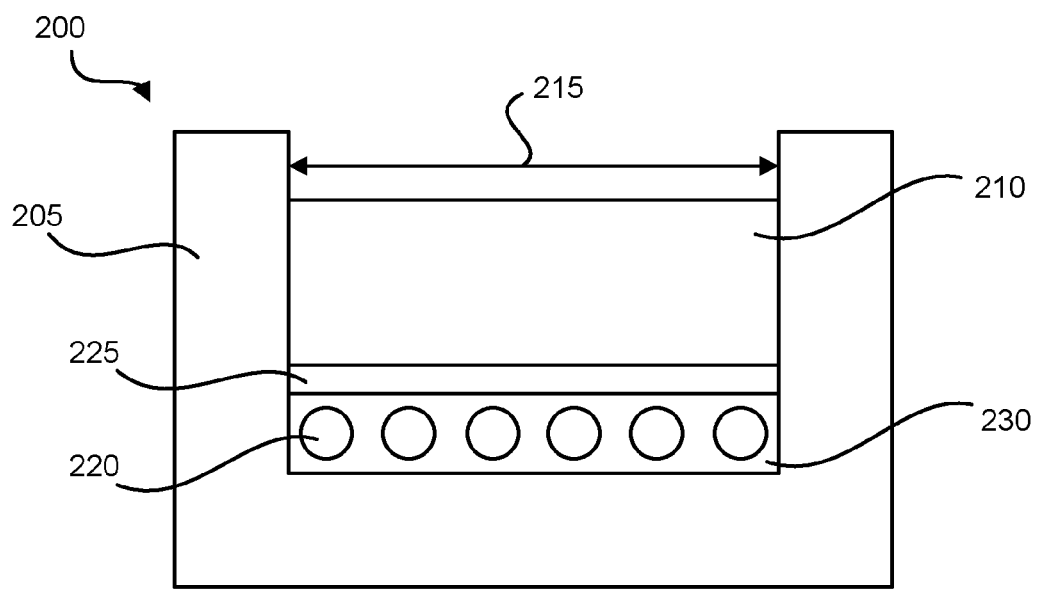
FIG. 2 is a cross-sectional front view of an optical connector in accordance with an example.

FIG. 2 is a cross-sectional front view of an optical connector 200 in accordance with an example. The optical connector includes a connector plate 205 having a slot 215 into which a retaining block 210 can be positioned to hold a plurality of optical fibers 220 in a desired position. As described above, the retaining block can be a lens or can include a lens element. In more specific examples the lens can be a plurality of lenses or the retaining block can include a plurality of lens elements. The retaining block, such as a retaining block with integrated lenses, can be positioned above the optical fibers to hold the optical fibers in the desired position and can include a portion (see FIG. 1) which extends downwardly in front of the optical fibers. A clear adhesive 225 can be applied over the optical fibers before positioning the lens to firmly secure the lens in position. The clear adhesive can have an index of refraction matching an index of refraction of the lens and/or optical fibers.

Other variations to what is described regarding FIG. 2 can also be made. For example, the optical connector 200 can include a retaining block 210 above the optical fibers which does not extend in front of the optical fibers 220 and is not necessarily a lens or does not necessarily include any particular optical qualities. In this example, the optical fibers can extend substantially to a front face of the connector plate 205 and can emit an optical signal directly to an optical fiber in a mating connector.

As another example, a lens 230 may be positioned in front of the optical fibers 220. The lens may be integral with the connector plate 205 or may be removably positioned within the slot 215. The lens can be permanently affixed into the slot using an adhesive or the like. A retaining block 210 can be positioned within the slot to hold the optical fibers in a desired position and can also extend over and hold the lens in position. In a variation, the retaining block can hold just the fibers in position and the lens can be separately held in position by integral formation with the connector plate, application of adhesive, etc. In this variation, the retaining block can extend over the fibers and not the lens. As a further configuration, the lens may comprise a height substantially similar to a height of the retaining block and be positioned or positionable in front of both the retaining block and the optical fibers. As another alternative, the retaining block and the lens may be formed together or formed separately and subsequently attached together. In this alternative, the combination of the retaining block and the lens may comprise multiple optical qualities. For example, the lens portion can be optically transmissive and the retaining portion may be optically opaque.

Where the lens 230 is formed integrally with the connector plate 205, the connector plate can be fabricated from a material that has a proper combination of optical and mechanical properties. Thus, a lens integrally formed with the connector plate can be a part of the connector plate and can be made together with the connector plate from a same material as the connector plate.

The retaining block 210 and/or lens can extend partially or fully along a height of the slot 215. Where the retaining block extends only partially along the height of the slot, a void can be left at the top of the slot. Alternately, a filler block or adhesive can be positioned over the retaining block to fill the void. The retaining block can be shaped and sized to fit within the slot 215. More specifically, sides of the retaining block can be shaped and sized to fit within the slot. A back portion of the retaining block can: extend beyond a back face of the connector plate 205, be flush with the back face of the connector plate, or may not extend as far as backward the back face of the connector plate. A front portion of the retaining block can: extend beyond a front face of the connector plate, be flush with the front face of the connector plate, or may not extend as far forward as the front face of the connector plate.

Because the connector is designed to mate with another connector, a configuration where the front portion of the retaining block is at least flush with or does not extend forward as far as the front face of the connector plate can be useful. In examples where the front portion of the retaining block extends beyond the front face of the connector plate, a retaining block in a mating connector can be recessed to receive the protruding portion of the protruding retaining block. Thus, the retaining blocks can provide an alignment feature. However, as will be described in further detail below, alignment features can alternately be formed with the connector plate and additional alignment features on the retaining blocks may be undesirable. Additionally, the connector plate may be a precision manufactured component for both receiving the optical fibers and mating with another connector plate for providing precise optical alignment of the optical fibers using a single precision component. Implementation of alignment features on the retaining block may involve precision manufacturing of the retaining block as well as the connector plate and thus increase an overall cost of the system.

Figure 3:
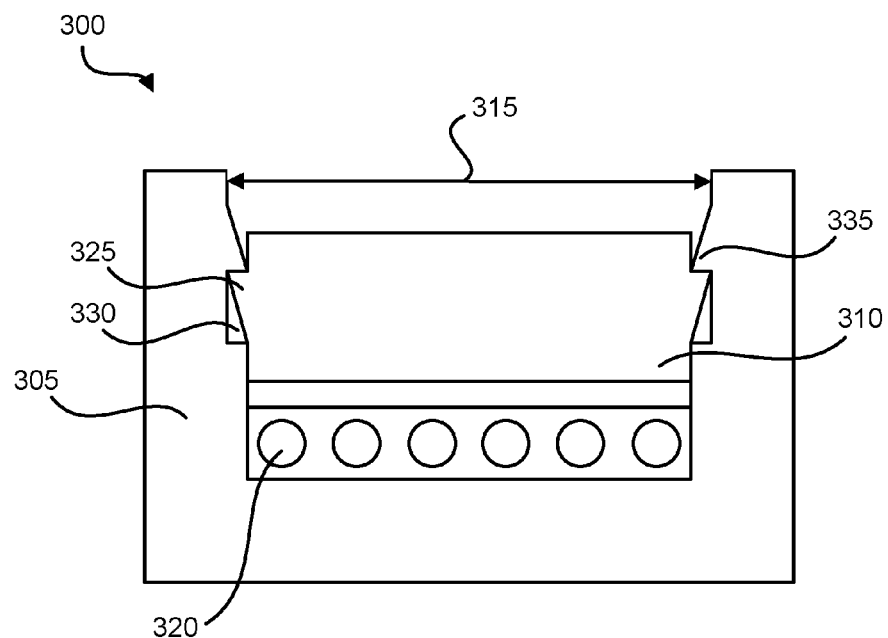
FIG. 3 is a cross-sectional front view of an optical connector with structure for holding a lens in a slot in accordance with an example.

Referring to FIG. 3, an optical connector 300 is shown. The optical connector includes a connector plate 305, a slot 315 in a side of the connector plate, and a retaining block 310 for holding optical fibers 320 in a desired position within the slot. In this example, the retaining block or lens includes a protrusion 325 on a side of the retaining block. The protrusion can be shaped to fit within a cavity 330 in a side wall of the connector plate. For example, the retaining block can be front-loaded into the slot by aligning the protrusions with the cavities and sliding the retaining block backward from a front face of the connector plate (shown) to a back face of the connector plate (not shown) into the slot. Where the retaining block is not a lens and/or does not include a portion extending downwardly in front of the optical fibers, the retaining block can be back-loaded into the slot be aligning the protrusions with the cavities and sliding the retaining block forward from the back face to the front face into the slot. Though the retaining block depicted in FIG. 3 includes sloped protrusions inserted into squared cavities, the protrusions and cavities may comprise any other shapes or combinations of shapes. For example, the protrusions may be squared to fit fully within the space provided by the cavities.

As another variation, the retaining block can be top-loaded into the slot. For example, the side walls of the slot can be wider near the top of the slot and may comprise a narrowing sloped portion 335 sloping downwardly and inwardly. The cavity may have a depth which when combined with the width of the slot at a narrowest part of the sloped portion is at least equal to the width of the slot at the top where the slot is wider. In other words, the cavity can have a depth sufficient to accommodate the protrusion on the retaining block. The protrusions on the retaining block can be correspondingly sloped such that the lens can be inserted into the slot and the protrusions "snapped" into place within the cavities. To enable snapping the retaining block into the slot, either the slot (or rather the connector plate in which the slot is formed), the retaining block, or both can be formed from a flexible or pliable material, or can be formed with sufficient give that the retaining block can be forced into the cavities without permanent deformation of either the slot or the retaining block.

In examples where the retaining block includes protrusions receivable into cavities in the slot, there can be more specific variations where the lens and the retaining block are separate components. In these variations, one or both of the lens and retaining block may include protrusions for insertion into cavities or sets of cavities in the slot.

Figure 4:
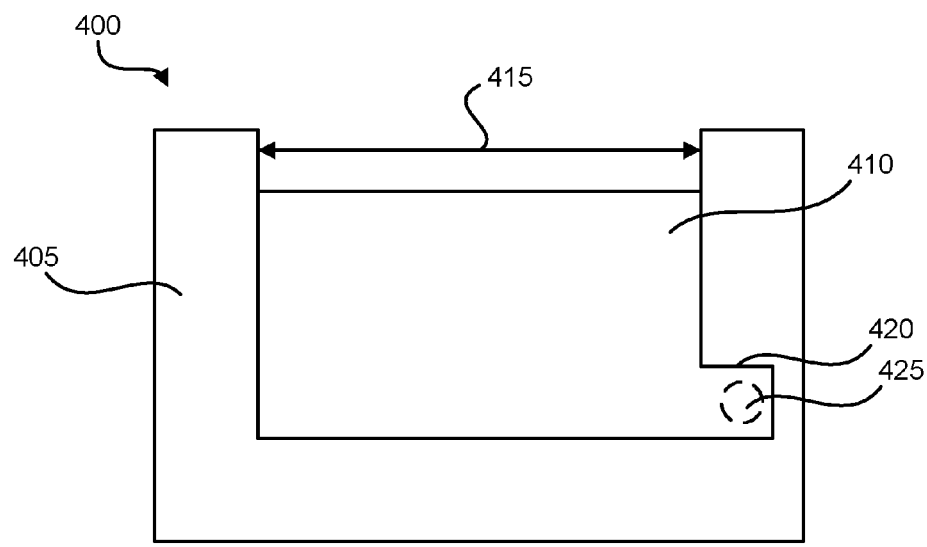
FIG. 4 is a front view of an optical connector including a lens with a tab for mating with a bore in a connector face in accordance with an example.

Referring to FIG. 4, a front view of an optical connector 400 including a lens 410 with a tab 420 is depicted. The tab can be used for alignment or positioning of the lens within the slot 415. For example, the tab can extend in front of the connector face from a portion of the lens in the slot. The tab can include a face portion substantially parallel to the connecting face which extends from the lens to a position in front of the connecting face. The tab can also include a cylinder portion substantially perpendicular to the connector face. The bore portion can be sized and shaped to fit within a bore 425 in the connector face. In other words, the cylinder portion of the tab can be arranged for mating with the bore in the connector face.

As described previously, protrusion of the lens forwardly from the connector face may involve precision manufacture of the lens such that the lens can be used to provide alignment features between two connectors. However, to reduce a cost of the connector and avoid precision manufacture of the lens, the connector plate can include a duct between the slot and the bore to receive the face portion of the tab such that the lens does not extend outwardly beyond the connector face. Thus, the lens can be manufactured without the precision of the connector plate because the lens is not mating with another lens in another connector plate in this example. In an example where the lens and the retaining block are separate components, one, both, or neither of the lens or retaining block may include a cylinder for insertion into a bore.

Figure 5:
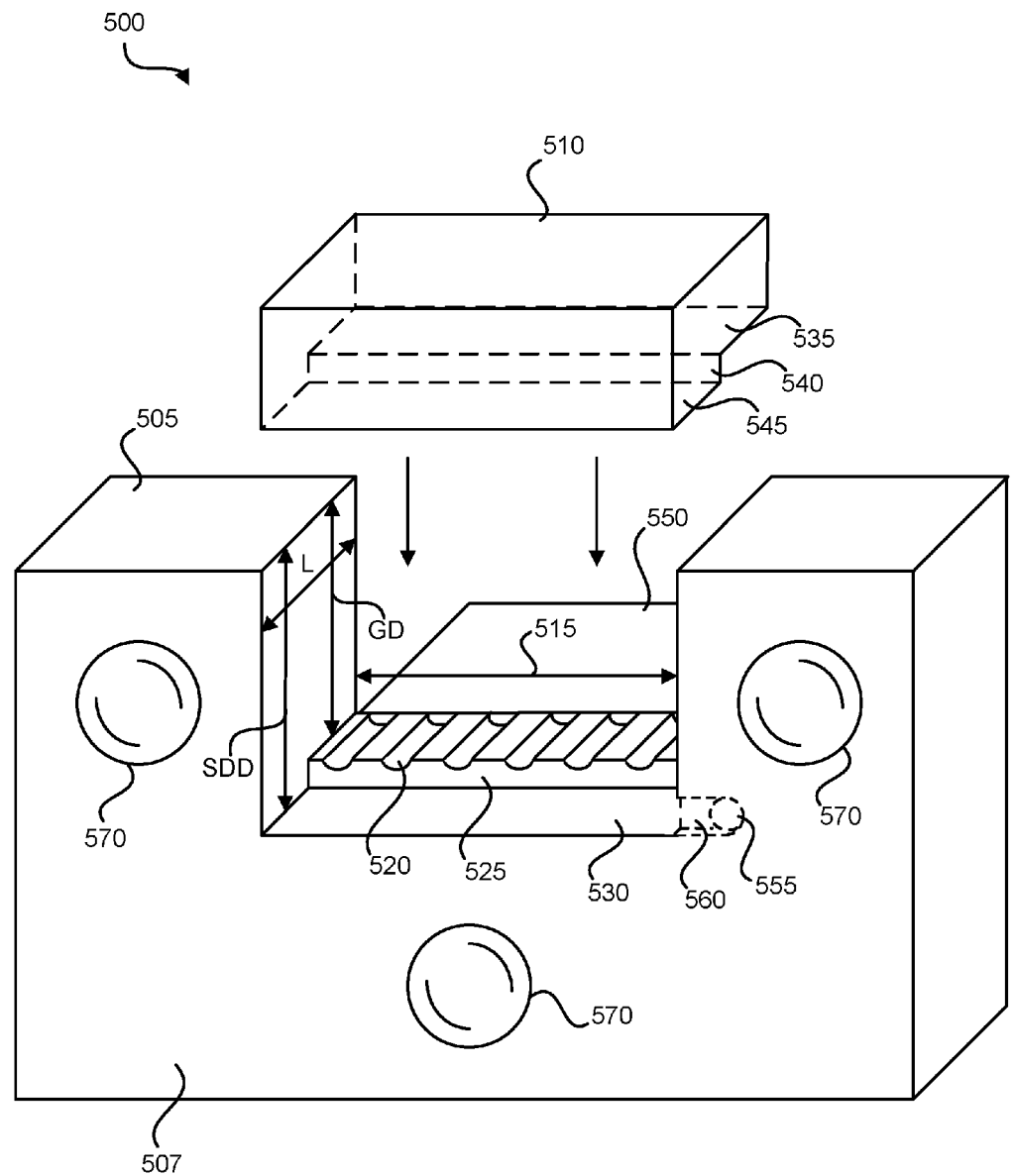
FIG. 5 is a perspective view of an optical connector illustrating top-loading of a lens in accordance with an example.

FIG. 5 is a perspective view of an optical connector 500 illustrating top-loading of a lens in accordance with an example. The connector includes a connector plate 505 having a connecting face 507 operable to mate with a different connecting face on a different optical connector. A slot 515 can be formed in a side of the connector plate and have a length L extending from the connecting face to an opposite face (or back face) in a direction substantially perpendicular to the connecting face.

A groove 520 can be formed in a portion of the bottom wall of the slot at a pre-defined groove depth GD and can extend at least partially along the length of the slot. The groove depth GD as shown is a depth to a top of the groove. However, the groove depth can also be calculated with respect to a bottom of the groove. The groove can receive an optical fiber (not shown). In one example, the slot can include a plurality of grooves in the bottom wall. For example, the slot may include twelve grooves for receiving twelve optical fibers from a 1×12 fiber ribbon. The slot can include any desired number of slots depending on the application and a number of fibers planned for input into the grooves. In one aspect, the connector can include a platform 550 extending outwardly and backwardly from the connecting face of the connector. The platform can be configured to support a fiber ribbon or other fiber input device. The platform can be positioned in a convenient position with respect to the grooves. For example, the top surface of the platform for supporting the fiber ribbon can be flush with a top of the grooves, with a bottom of the grooves, or positioned between the top and bottom of the grooves. In another example, the grooves can extend at least partially onto the platform.

The grooves 520 can be sized and shaped to receive the optical fibers. For example, the grooves can have a substantially same width as the optical fibers, or a width slightly smaller or greater than the width of the optical fibers. A height of the grooves (not to be confused with the groove depth GD) from a bottom of the groove to the top of the groove can be substantially similar to a cross-sectional height of an optical fiber or can be greater or lesser than the cross-sectional height of the optical fiber. For example, the groove height can be approximately ¼, ½, or ¾ of the cross-sectional height of the optical fiber. A cross-sectional shape of the grooves can be matched to a cross-sectional shape of the optical fiber. For example, where an optical fiber has a substantially circular cross-sectional shape, the cross-sectional shape of the groove can include an at least partially circular portion. For example, a bottom portion of the cross-sectional shape of the groove may be semi-circular. Depending on the groove height, groove side walls may include substantially vertical portions extending upwardly from the semi-circular bottom portion. In another example, the grooves may have a circular cross-section and be bored through the connector plate such that the fibers can be inserted into the holes formed by the bored grooves.

The slot 515 can include a slot datum area 530 formed in a different portion of the bottom wall of the slot from the portion of the slot where the grooves are formed. The slot datum area can have a datum area depth or slot datum depth SDD which is greater than the groove depth GD. A datum side wall 525 can extend between the slot datum area and the grooves 520.

The optical connector can also include a lens 510 shaped to fit between side walls of the slot. The lens can also be shaped to fit between the connecting face and the opposite face. The lens can be used to retain the optical fibers within the grooves in the slot, and the lens can be shaped to correspond to a geometry of the slot. For example, the lens can include a groove portion 535 configured to extend over the grooves in the slot. The lens can also include a lens datum portion 545 extending below the groove portion at a lens datum portion depth. The lens datum portion depth can be approximately equal to a difference between the datum area depth SDD and the groove depth GD. Thus, the lens datum portion can be positioned over the slot datum area and adjacent a bottom of the slot datum area when the groove portion is positioned over the grooves. In some examples, the lens datum portion can further have a dimension sufficient that a front of the lens does not extend farther in front of the connecting plate 505 than the front face 507 of the connecting plate. In one aspect, the lens datum portion can have a dimension substantially equal to a corresponding dimension of the slot datum area such that the front of the lens is flush with the front face of the connecting plate. The datum side wall 525 can be used for proper alignment of the lens within the slot by abutting a lens side wall 540 against the datum side wall.

While FIG. 5 illustrates the lens 510 being top-loaded into the connecting plate 505, the lens may also be front-loaded from the front or connector face 507. Though not shown in FIG. 5, the connector 500 can also include a retaining block in addition to the lens (see FIG. 3). In one aspect, the retaining block and the lens can be loaded differently. Thus, for example, the lens may be configured for top loading and the retaining block may be configured for front-loading.

As described above, the connecting face or front face 507 of the connector plate 505 can be contoured to mate with another connecting face of another connector. Thus, two connectors or two connector halves can be shaped to mate one with another. For example, each connecting face may comprise a flat surface, or may comprise one or more protrusions, indentations, or the like, corresponding to mating protrusions, indentations, and the like in the mating connector. The connector of FIG. 5 includes multiple mating features 570 for mating with another connector.

When two connectors or connector halves move into close proximity to each other, a force may be generated by a force mechanism associated with one or both connectors. As the connectors come into proximity and the force mechanism moves the connectors together, the components on the connector may move, rotate, or slide with components on the other connector during and after the alignment of the connectors to each other. As the connectors engage, guide elements may bring optical elements used in board-to-board or circuit-to-circuit communication into precise alignment. Precise alignment enables data signaling to be accomplished by optical signals.

In one aspect, the connector may be a self-aligning proximity connector because the alignment may be automatic when two mating ends of the connector come within proximity to each other. The connector may also be referred to as a passively self-aligned optical blind-mate connector, because the connector alignment can occur with another force that may not be directly applied to the connector.

In one aspect, connectors or connector halves can be specifically shaped to mate with a specific other connector or connector half. Thus, in a set of connectors, connector pairs may include connectors shaped to mate with the other connector from the pair and not with any other connectors in the set. This can ensure that, for example, a specific PCB gets mated with another specific PCB, or that a particular blade PCB gets mated only at a desired optical connection location among many on a PCB backplane.

The connector 500 also optionally includes a bore 555 and a duct 560 to receive an optional tab or cylinder tab from the lens 510.

FIG. 5 and the other figures primarily illustrate connector examples using a linear arrangement of optical fibers. However, other arrangements may also be used. For example, an array of fibers may be provided where one row of optical fibers is stacked on another row of optical fibers, with the bottom-most row being placed in the grooves. To maintain positioning of the optical fibers for proper alignment, each row of optical fibers can be offset from the lower row by a half fiber width (or other suitable width) such that an upper row of fibers not in the grooves is positioned in troughs formed by adjacent fibers in a lower row of fibers (which is either positioned in grooves or in troughs formed by an even lower row of fibers).

Figure 6:
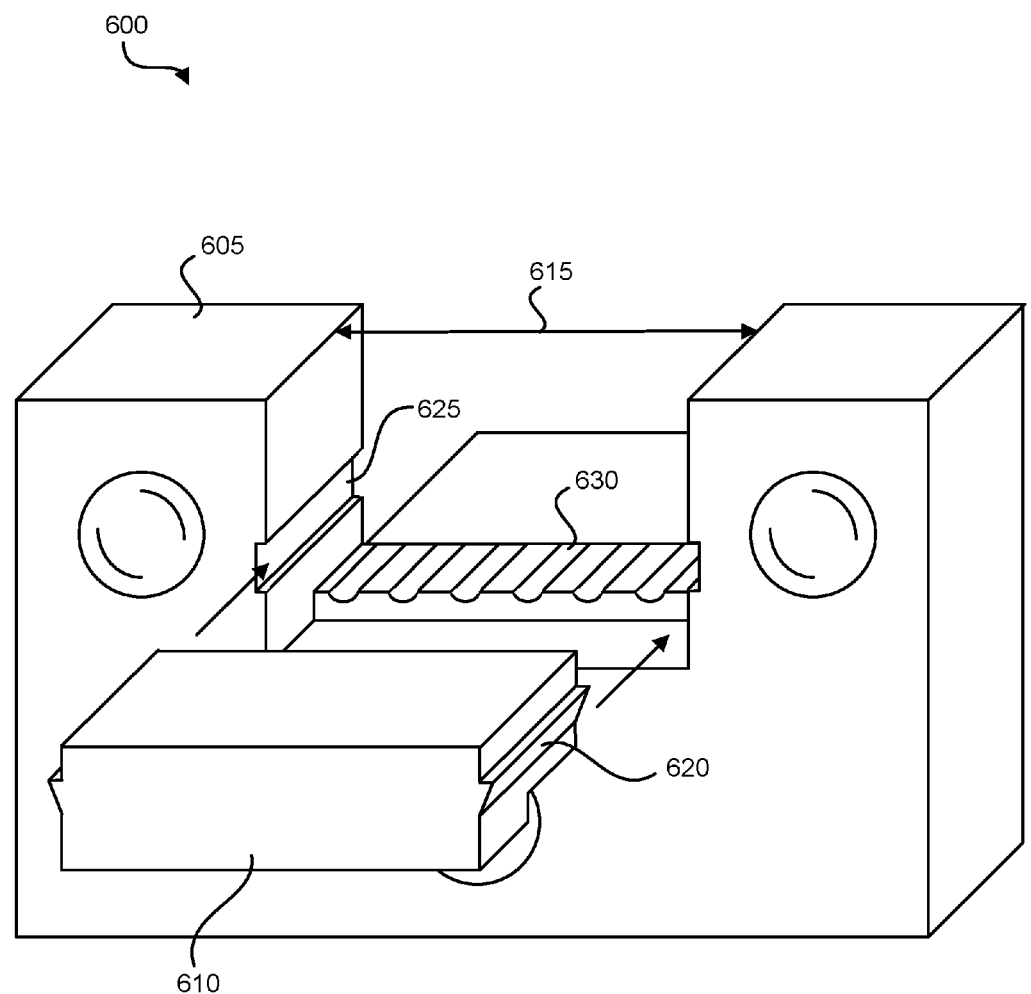
FIG. 6 is a perspective view of an optical connector illustrating front-loading of a lens in accordance with an example.

Referring to FIG. 6, a connector 600 is illustrated which is similar in many regards to the connectors described above. FIG. 6 illustrates a perspective view of the connector, with a lens 610 being front-loaded into a slot 615 of the connector. In this example, the lens includes protrusions 620 shaped to fit within cavities 625 in side walls of the slot to assist in positioning the lens in the slot and holding the lens in position over the grooves 630.

While FIG. 6 illustrates cavities extending from a front to a back of the connector plate 605 for receiving the protrusions on the lens, the cavities may be configured to extend only partially from the front to the back or vice versa, and the lens protrusions can be shaped to match the cavities. As another example, rather than extending horizontally along side walls of the slot, the cavities can extend vertically along side walls of the slot. As yet another example, the cavities can have different portions extending in different directions, such as a vertical cavity portion for top loading the lens and a horizontal cavity portion for sliding the lens into position after loading.

Figure 7A:
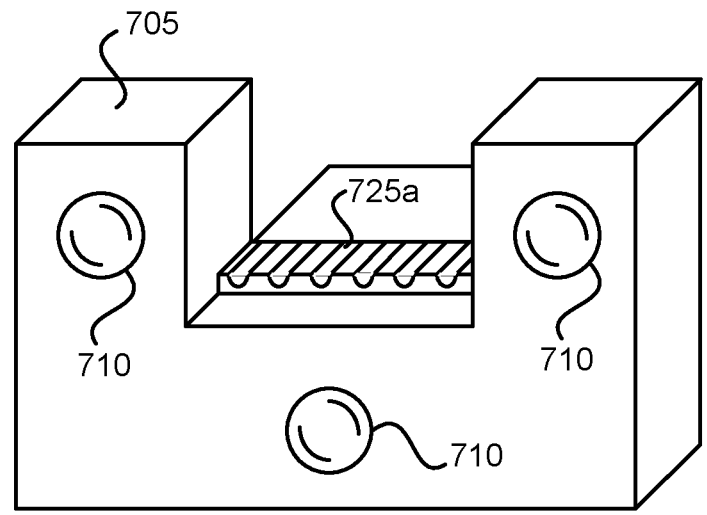
FIGS. 7A-7B are perspective views of mating receptacle and connector plates for an optical connector in accordance with an example.
Figure 7B:
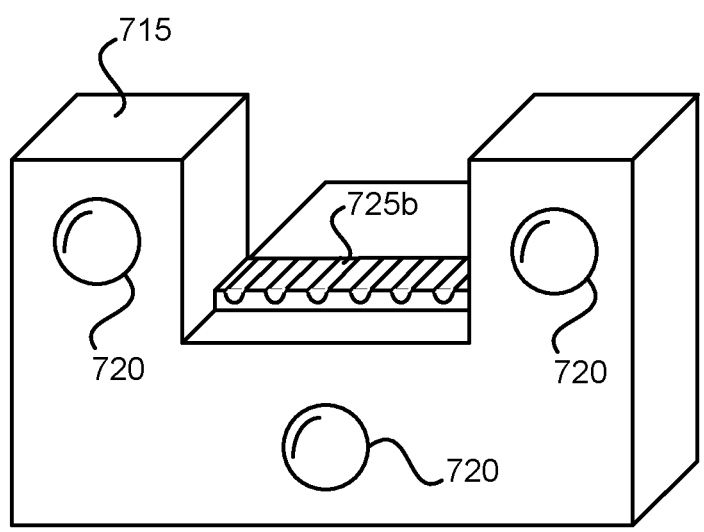

FIGS. 7A-7B are perspective views of mated receptacle and connector plates for an optical connector in accordance with an example. FIG. 7A illustrates a receptacle plate 705. The receptacle plate is termed a "receptacle" plate in this example because the receptacle plate includes a plurality of holes, indentations, or depressions 710. The depressions are shaped to receive protrusions 720 on the connector plate 715 shown in FIG. 7B. In one example, the receptacle plate includes spherical depressions 710 referenced to the grooves 725a, though other shapes and configurations may also be used. The connector plate includes spheres or semi-spheres 720 at least partially protruding from the connector plate mating face which are referenced to the grooves 725b. The spheres can locate in the precision depressions when the connector and receptacle plates are positioned together such that the grooves in the connector and receptacle plates are aligned. Thus, when optical fibers are in the grooves, optical signals can be successfully transmitted from an optical fiber in one of the connector and receptacle plates to an optical fiber in the other of the connector and receptacle plates.

The connector and receptacle plates can be formed from any suitable material. For example, metal, plastic, silicon, composites, etc. may be used. Where metal is used, the connector and receptacle plates can be coupled together using magnetism. For example, magnets, such as rare earth magnets, can be located in or behind/under the holes in the receptacle plate. Whether the connector and receptacle plates are metal or not, magnetism can be used for coupling the plates together, such as by including magnets in the spheres and in the holes.

For connecting and disconnecting the connector and receptacle plates, either connector half can move relative to the other. As a floating connector head (e.g., a connector plate) comes into contact with a fixed connector head (e.g., a receptacle plate), the floating can adjust to the fixed head based on the contours of the fixed and floating heads and due to force exerted on the fixed and floating heads, such as by magnetism.

Figure 8:
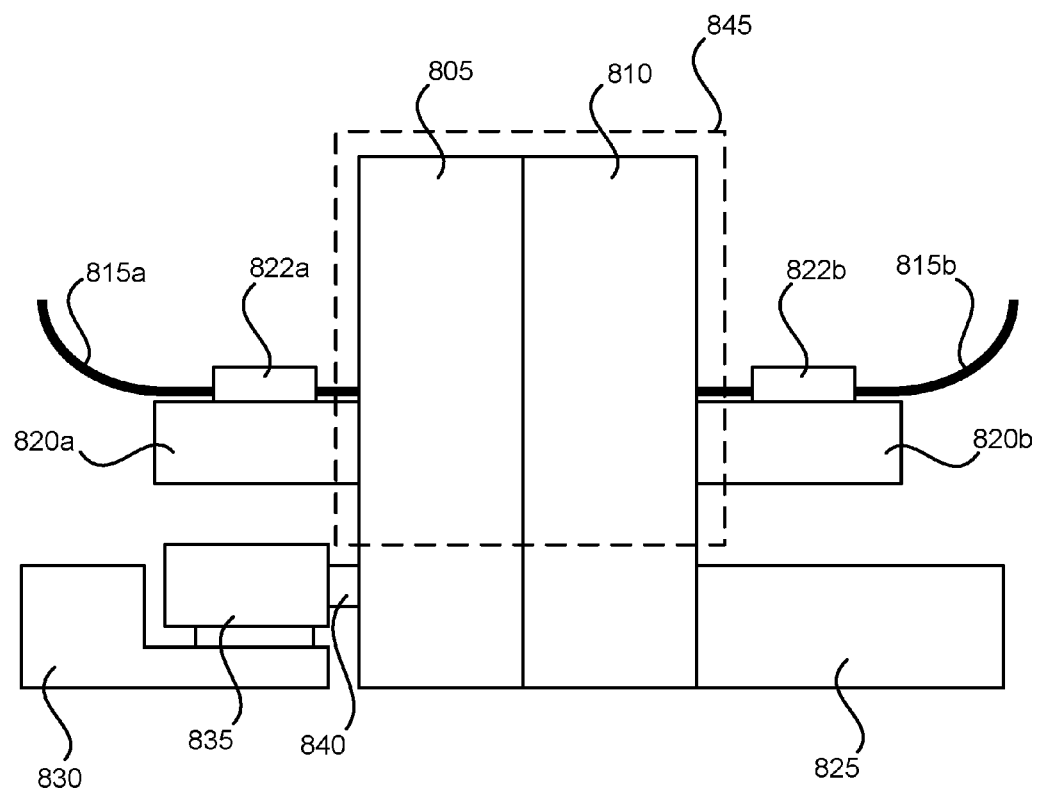
FIG. 8 is a side view of mated receptacle and connector plates in accordance with an example.

Referring to FIG. 8, a side view of mated receptacle and connector plates 805, 810 is shown in accordance with an example. Fiber optic inputs 815a, 815b are connected into the plates for communicating from one to another. Each of the connector plates in this example includes a platform 820a, 820b extending from a side thereof for supporting the fiber optic inputs. The platforms may include a restraining device 822a, 822b for securing the fiber to the plate to ensure that the fiber optic input is not inadvertently dislodged or removed from the plate, which could disrupt optical communication and/or damage the connector or fiber input. Some example restraining devices include clamps, straps, and the like.

The receptacle and connector plates can each include a base or attachment portion for attachment to a PCB or other device. For example, plate 810 includes base 825 for connection to a PCB (not shown). Plate 805 can include a similar base as plate 810, or a different base as shown in the figure. The base 830 of plate 805 may include a connector rod 840 attached to a spring mechanism 835, which is attached to the base 830. The spring can allow the plate to float approximately a couple of millimeters in all directions. Enabling the plate to float can enable a better and more accurate connection between the plates, such as if a blade PCB does not perfectly align with a backplane PCB.

A cover 845 may be used to protect the connectors and/or to hold the connectors together. The cover may be coupled to one of the plates 805, 810, one of the platforms 820a, 820b, one of the bases 825, 830, or one of the PCBs. In another example, a cover may be provided with both connector halves, and one cover may be selected to cover the connectors. In another example, the cover may comprise two halves, one half associated with each connector half, where each of the two halves can be attached together when the connector halves are mated. The cover can be a flexible or rigid cover. The cover can extend over the plates 805, 810 or may cover the plates, platforms, bases, etc. as desired. The cover can protect the connectors from dust, heat, damage, etc. based on a configuration of the cover.

The PCBs may be attached to a chassis in a horizontal and/or vertical configuration. Support or attachment of the PCBs to the chassis may be provided by sheet metal slots or notches in the chassis, and a retention force of electrical connectors on an edge of the PCBs blade coupled to the chassis. The support may be used to provide stability, support, and uniform distance between PCBs in a chassis or to attach PCBs together. The PCBs blades may be parallel to each other. The insertion of a PCB blade can place the face of the alignment module within the proximity of the face the corresponding alignment module positioned on the chassis, so the force mechanism, flexible mechanism, and mechanical guides may align the connector. The connector may be normal to the face of the PCBs or the connector may be normal to an edge of the PCBs. Connectors may provide board-to-board, PCB-to-PCB, or inter-chip communication.

Using a self-aligning proximity connector provides high speed interconnects without the use of bulky and expensive optical cabling and precision components, thus reducing a cost and complexity of optical interconnects. In addition, high bandwidth can be achieved in a relatively small volume and footprint on a PCB. The connector also allows the interconnect to align and connect with the insertion of a PCB blade into a computer chassis and detach with the removal of the PCB blade from the chassis. The interconnection can be independent of the direction of blade motion into and out of the computer chassis.

The connector does not involve a precision manufactured ferrule in addition to the connector plate. Thus, the complexities and costs of assembly and manufacture are reduced over existing interconnect assemblies, and the cost of integration of optical components into computing technologies is decreased.

The connectors described can assist in the conversion from electrical connectivity to optical connectivity in computing and networking systems by providing a less complex and less expensive connector, thus encouraging the adoption of optical systems. As data transmission frequencies increase in conjunction with increases in bandwidth, the limits of data transmission through copper traces on PCBs becomes increasingly apparent. Data rates at or above 10 Gbps can experience issues with signal integrity in electrical systems, while optical components have little to no apparent issues with signal integrity. The connectors herein can also be more compact and space-efficient when compared with other optical connectors. By reducing the size, cost, and complexity of optical connectors, conversion to optical signaling can be promoted.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An optical proximity connector, comprising:
a connector plate having a connecting face to mate with a different connecting face on a different proximity connector;
a slot formed in a side of the connector plate and having a length (L) extending from the connecting face to an opposite face in a direction perpendicular to the connecting face;
a groove formed in a groove portion of a bottom wall of the slot and at least partially extending along the length of the slot, the groove being shaped to receive an optical fiber; and
a retaining block shaped to fit between side walls of the slot and between the connecting face and the opposite face to retain the optical fiber within the groove; and
a slot datum area formed in a datum portion of the bottom wall of the slot, the slot datum area comprising a datum area depth (SDD) which is greater than a groove depth (GD), and a datum side wall extending between the slot datum area and the groove.

2. The proximity connector of claim 1, wherein the retaining block comprises:
a retaining block groove portion configured to extend over the groove in the slot; and
a retaining block datum portion extending below the retaining block groove portion at a retaining block datum portion depth, wherein the retaining block datum portion is positionable over the slot datum area and adjacent to the datum side wall.

3. The proximity connector of claim 1, wherein at least one of the side walls of the slot comprises a cavity therein and at least one retaining block side wall comprises a protrusion arranged to extend into the cavity when the retaining block is in position between the side walls of the slot and between the connecting face and the opposite face.

4. The proximity connector of claim 1, wherein at least one of the side walls of the slot comprises a protrusion therefrom and at least one retaining block side wall comprises a cavity arranged to receive the protrusion when the retaining block is in position between the side walls of the slot and between the connecting face and the opposite face.

5. The proximity connector of claim 1, wherein the connector plate comprises a bore in the connecting face and the lens comprises a tab extending in front of the connecting face from a portion of the retaining block in the slot, wherein the tab comprises a face portion parallel to the connecting face and a cylinder portion perpendicular to the connecting face, the cylinder portion being arranged to fit within the bore when the retaining block is in position between the side walls of the slot and between the connecting face and the opposite face.

6. The proximity connector of claim 5, wherein the connecting face comprises a duct to receive the face portion of the tab, such that the retaining block does not extend outwardly beyond the connecting face.

7. The proximity connector of claim 1, further comprising a clear adhesive with an adhesive index of refraction substantially matching an index of refraction of the retaining block, the adhesive being applied between the slot and the retaining block.

8. The proximity connector of claim 1, wherein the retaining block comprises a lens, the proximity connector further comprising a second retaining block shaped to fit between the side walls of the slot and between the connecting face and the opposite face to retain the lens in the slot.

9. The proximity connector of claim 1, further comprising a magnet for holding the connector plate together with the different proximity connector.

10. The proximity connector of claim 1, wherein the connecting face comprises a contour to position the optical fiber and a second optical fiber in substantial alignment when the optical proximity connector is mated with the different proximity connector.

11. The proximity connector of claim 10, wherein the contour of the connecting face comprises a plurality of reference surfaces shaped to fit within a plurality of reference holes in the different connecting face.

12. The proximity connector of claim 1, further comprising a dust cover shaped to fit over the proximity connector when the connecting face and the different connecting face are mated.

13. The proximity connector of claim 1, further comprising the different proximity connector.

14. The proximity connector of claim 1, wherein the slot, the groove, and the retaining block are combinedly shaped to receive and retain a plurality of stacked rows of optical fibers.

* * * * *